United States Patent
Sinnhuber et al.

(10) Patent No.: US 6,189,919 B1
(45) Date of Patent: *Feb. 20, 2001

(54) STEERING COLUMN ARRANGEMENT FOR OCCUPANT PROTECTION (75) Inventors: Ruprecht Sinnhuber, Gifhorn; Thomas Wohllebe, Braunschweig, both of (DE)

(73) Assignee: Volkswagen AG, Wolfsburg (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/059,828

(22) Filed: Apr. 14, 1998

(30) Foreign Application Priority Data

Apr. 16, 1997 (DE) ............................. 197 15 883

(51) Int. Cl.[7] .................................. B60R 21/16
(52) U.S. Cl. ...................... 280/731; 188/377; 74/492; 280/777
(58) Field of Search ................... 280/777, 731, 280/728.2; 188/371, 377; 74/492

(56) References Cited

U.S. PATENT DOCUMENTS

| | | | |
|---|---|---|---|
| 3,434,367 | * 3/1969 | Renneker et al. | 74/492 |
| 3,771,379 | * 11/1973 | Rohrbach | 74/492 |
| 3,805,636 | * 4/1974 | Howes | 74/492 |
| 3,832,911 | * 9/1974 | Daniel et al. | 74/492 |
| 4,102,217 | * 7/1978 | Yamamoto et al. | |
| 4,531,619 | * 7/1985 | Eckels | 280/777 |
| 4,867,003 | * 9/1989 | Beauch | 280/777 X |
| 4,886,295 | * 12/1989 | Browne | 280/777 |
| 4,968,058 | * 11/1990 | Jones | 280/777 |
| 5,026,092 | * 6/1991 | Abramczyk | 280/777 |
| 5,088,768 | * 2/1992 | Maruyama et al. | 280/777 |
| 5,115,691 | * 5/1992 | Beauch | 280/777 X |
| 5,169,172 | 12/1992 | Dolla | 280/777 |
| 5,193,848 | * 3/1993 | Faulstroh | 280/777 |
| 5,290,059 | * 3/1994 | Smith et al. | 280/731 |
| 5,295,712 | * 3/1994 | Omura | 280/731 |
| 5,368,330 | * 11/1994 | Arnold et al. | 280/777 |
| 5,378,021 | * 1/1995 | Yamaguchi et al. | 280/777 |

(List continued on next page.)

FOREIGN PATENT DOCUMENTS

| | | |
|---|---|---|
| 2187547 | 4/1997 | (CA) . |
| 19508443 | 9/1995 | (DE) . |
| 19530589 | 2/1997 | (DE) . |
| 296 14 586 U | 2/1997 | (DE) . |
| 19532296 | 3/1997 | (DE) . |
| 296 16 909 | 3/1997 | (DE) . |
| 296 16 914 | 3/1997 | (DE) . |
| 296 17 721 | 3/1997 | (DE) . |
| 296 21 295 | 3/1997 | (DE) . |
| 19541998 | 5/1997 | (DE) . |
| 19609266 | 6/1997 | (DE) . |
| 19525928 | 7/1997 | (DE) . |
| 297 02 441 U | 7/1997 | (DE) . |
| 19643451 | 8/1997 | (DE) . |
| 519206 A1 | * 12/1992 | (EP) ................................. 280/777 |
| 0769423 | 4/1997 | (EP) . |
| WO 95/23712 | * 8/1995 | (WO) . |
| WO 98/28166 | * 7/1998 | (WO) . |

*Primary Examiner*—Lanna Mai
*Assistant Examiner*—Lynda Jasmin
(74) *Attorney, Agent, or Firm*—Baker Botts L.L.P.

(57) ABSTRACT

A steering column for a vehicle is an integral constituent of a safety steering arrangement or an occupant protection arrangement. To minimize the risk of injury to vehicle occupants, the steering column includes deformation members and a geometrically stable intermediate segment. Such a steering column is combined with a steering wheel to which an airbag cover, movable into an open position by the airbag, is articulated so that it will not protrude from the contour of the steering wheel during opening motion of the airbag.

40 Claims, 4 Drawing Sheets

U.S. PATENT DOCUMENTS

| | | | | |
|---|---|---|---|---|
| 5,503,426 | * | 4/1996 | Lang et al. | 280/731 |
| 5,505,483 | * | 4/1996 | Taguchi | 280/731 X |
| 5,547,221 | * | 8/1996 | Tomaru et al. | 280/777 |
| 5,553,888 | | 9/1996 | Turner et al. | 280/731 |
| 5,584,501 | * | 12/1996 | Walters | 280/731 X |
| 5,597,177 | * | 1/1997 | Matsuura | 280/731 |
| 5,599,039 | * | 2/1997 | Goss et al. | 280/731 X |
| 5,609,356 | * | 3/1997 | Mossi | 280/731 |
| 5,618,058 | * | 4/1997 | Byon | 280/777 |
| 5,626,360 | * | 5/1997 | Lauritzen et al. | |
| 5,630,611 | * | 5/1997 | Goss et al. | 280/731 X |
| 5,655,789 | * | 8/1997 | Kreuzer | 280/731 |
| 5,676,396 | * | 10/1997 | Fohl | 280/731 |
| 5,700,031 | | 12/1997 | Heilig et al. | 280/731 |
| 5,716,068 | * | 2/1998 | Sahara et al. | 280/731 |
| 5,722,686 | * | 3/1998 | Blackburn | 280/731 X |
| 5,727,811 | * | 3/1998 | Nagata et al. | 280/731 |
| 5,730,459 | * | 3/1998 | Kanda | 280/731 |
| 5,749,598 | * | 5/1998 | Exner et al. | 280/731 X |
| 5,755,458 | * | 5/1998 | Donovan | 280/731 X |
| 5,765,860 | * | 6/1998 | Osborn | . |
| 5,772,241 | * | 6/1998 | Heilig | 280/731 |
| 5,806,883 | * | 9/1998 | Cuevas | 280/731 |
| 5,810,391 | * | 9/1998 | Werner et al. | 280/731 |
| 5,829,777 | * | 11/1998 | Sakurai | 280/731 |
| 5,836,609 | * | 11/1998 | Coleman | 280/731 X |
| 5,870,930 | * | 2/1999 | Willett | 280/777 X |
| 5,871,228 | * | 2/1999 | Lindsey et al. | 280/728.2 |
| 5,893,580 | * | 4/1999 | Hoagland | 280/731 |
| 5,924,725 | * | 7/1999 | Kozyreff et al. | 280/731 |

* cited by examiner

STEERING COLUMN ARRANGEMENT FOR OCCUPANT PROTECTION

BACKGROUND OF THE INVENTION

This invention relates to a steering column arrangement for vehicles as well as occupant protection arrangements, safety steering features, and steering wheels using such steering column arrangements. The invention also relates to methods of producing steering column arrangements.

Steering column arrangements in vehicle construction are generally known and have numerous modifications. Such steering column arrangements are usually provided with a deformable structure so that in a frontal impact the steering column and steering wheel will not be moved toward an occupant. The deformations which occur in the front of the car during a frontal impact thus positively assure that the spacings between a first connection of the steering column with the steering wheel and between a second connection of the steering column with the steering mechanism will be compressed. Merely by way of example, reference is made in this context to U.S. Pat. No. 5,169,172. For occupant protection in vehicles, it is also known that steering columns of the type described above may be coupled to steering mechanisms by energy absorbing elements so that in event of an impact by the occupant on the steering apparatus during an accident, the risk of injury may be very much reduced. A typical arrangement is disclosed in German Offenlegungsschrift No. 195 08 443 A1.

SUMMARY OF THE INVENTION

Accordingly, it is an object of the present invention to provide a steering column arrangement for vehicle occupant protection which overcomes disadvantages of the prior art.

Another object of the invention is to provide a steering column arrangement by which the risk of injury to vehicle occupants may be further reduced.

These and other objects of the invention are attained by providing a uni- or multi-part steering column having connections which include at least one associated deformation member. Such deformation members are constructed to be deformed in response to an application of force having a magnitude to be expected in an accident so that they make possible a compression of the steering column which is required for reasons of safety either alone or supplementary to conventional compression arrangements. As a further important feature, an intermediate steering column segment of essentially stable shape is provided between two or more such deformation members . In this context, "stable shape" means that, under the loads to be expected during a vehicle accident, no significant deformations occur. The change in length of this segment of the steering column when acted upon by compressive forces during a collision are so slight that they amount to, for example, at most 5% of the total compression of the steering column arrangement.

The spaced arrangement of deformation members with inclusion of an intermediate segment of essentially stable shape provides numerous advantages. The steering column itself contributes to energy absorption and thus ensures a relatively gentle contact of a vehicle occupant with the steering column arrangement as the impact force approaches the force response threshold of a steering column bearing in which the steering column is rotatably supported on the vehicle structure. Furthermore, the deformation members provide an articulation function. Thus, for example, the deformation member between the stable segment of the steering column and the steering mechanism can diminish the tilting motion of the entire steering column which normally occurs in front end collisions so that there is hardly any upward motion of the steering wheel. Supplementarily or alternatively, articulated motion of the deformation element between the stable segment of the steering column and the steering wheel makes it possible that, especially in the case of an exceptionally large or small occupant, an energy absorbing displacement of the steering wheel can take place even though it is oriented at an unfavorable angle with respect to the occupant. In this connection, it should be noted that some of the energy absorption capacity normally provided by the steering wheel itself can be transferred to the adjacent deformation element. Accordingly, the steering wheel itself need not be a three- or four-spoke steering wheel, but may be a two-spoke wheel instead. This permits additional lightweight construction potentials for a steering system which includes a steering column arrangement according to the invention.

Another important advantage of the invention is that, with a steering column of tubular construction, parts of an airbag arrangement may be mounted directly within the steering column. In other words, the steering column also serves as the housing for at least one gas generator with a diffuser and associated airbag. Likewise possible is a subdivided airbag arrangement in which only the gas generators, for example, are mounted inside the steering column, while the airbag to be filled by the gas generators is stowed inside the hub of the steering wheel. Snap fastenings such as are described, for example, in the published International Application No. WO 97/01460 may be used for attachment of the steering wheel to the steering column. In contrast to the embodiments disclosed therein, however, the gas generator in a preferred embodiment of the invention is not mounted in the steering wheel hub, but instead is mounted in the intermediate segment of the steering column. This arrangement also provides potential for lightweight construction, for example, by making the gas generator housing an integral component of a cylindrical jacket constituting the intermediate segment of the steering column in accordance with the invention. In other words, the inner wall of the intermediate segment of the steering column is at the same time a housing wall for one or more gas generators. The outer wall of the intermediate segment, by contrast, provides a seat for rotary bearing members in a steering column support.

The invention also permits the use of ring fuses for propellant charges accommodated in the gas generators which may be activated regardless of the angular position of the steering wheel. The winding lines normally extending around the steering column in conventional steering systems for connecting the gas generator to a control unit, i.e., the so-called winding springs, may thus be omitted entirely. Conventional ring fuses such as are known, for example, in ordnance technology may be used. The ring fuses may either be arranged on the outside of the intermediate segment of the steering column or be integrated in its walls. Ignition energy may be introduced into the propellant charge of the ring fuses by a mechanically and/or electromagnetically operated trigger.

To provide a simplified assembly and to reduce the total number of parts, it is preferable to fabricate the tubular member as a hydroformed and/or internal high-pressure transformed part. With such fabrication, all connections, for example adapter segments for coupling a steering column base to the steering mechanism or for the steering mechanism itself, are molded directly onto the steering column.

In addition, such moldings can form an arrest notch or cam in which, for example, a bolt actuatable by a steering wheel lock can be received to lock the steering column.

Alternatively, the tubular member may be produced by rolling. In a preferred method of production, first a subassembly consisting, for example, of gas generator and a diffuser, is mounted within a semi-fabricated tube. Then, by rolling deformation, an energy-absorbing bellows or corrugated deformation section is rolled on at each of the two free ends of the tube so that the subassembly is fixed in place in the tube at the same time. The assembly thus produced may be enlarged by adding at least one airbag or may be combined with a steering wheel in which an airbag is mounted.

Especially important is the arrangement of at least one of the deformation elements as a damper to control the expansion velocity of the airbag. For this purpose, folds of the airbag may be laid with precision in troughs of the deformation element so that, for example, in the initial airbag inflation stage, friction retards the enlargement of the airbag in a defined manner assuring that a vehicle occupant will not be struck with exaggerated force by the expanding airbag despite an adequate supply of gas to fill the airbag.

An advantage of the present invention is the broad applicability of the steering column arrangement as well as other safety steering structures for occupant protection. For the latter, however, use of the steering column arrangement according to the invention is not obligatory. Such safety steering structures may be combined if desired with steering columns of conventional design.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Like parts are numbered alike in all figures.

Figure 1:
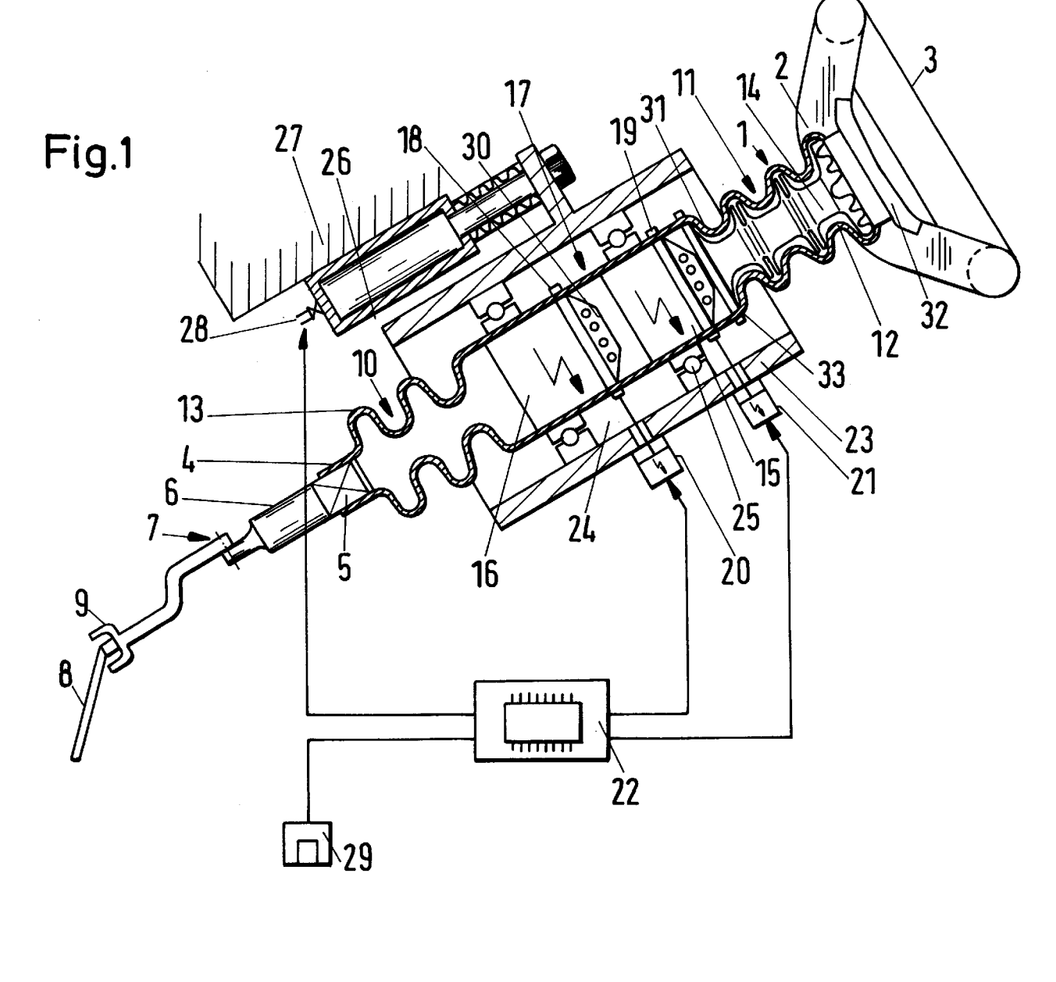
FIG. 1 is a schematic side view, partly in section, illustrating a representative embodiment of a steering column arrangement according to the invention as a constituent part of a corresponding occupant protection arrangement.

In the typical embodiment of the invention shown in FIG. 1, a steering column 1 has a first coupling 2 to which a steering wheel 3 is affixed, preferably with a snap fastening, and a second coupling 4, having a polygonal cross-section which receives a correspondingly shaped coupling part 5 of a steering column base 6. The base 6 received in the coupling 4 has a bipartite construction including a first compression region 7, which contributes to shortening of the entire steering column 1 in a frontal impact when high axial loads are applied to it by an articulation rod 8 in response to front-end deformations, and a universal joint 9. Additional compression regions 10 and 11 are provided by corresponding deformation members 12 and 13, which, in this embodiment, have a bellows or corrugated-tube configuration. The strength of these deformation members 12 and 13, is arranged so that, in normal steering operation, no torsional or compressive strains can cause any change in shape. Under extreme loads, however, such as occur during a vehicle accident, the meandering form of the bellows or corrugated-tube wall cross-section permits deformation, not only shortening the steering column 1 as a whole but also changing its inclination relative to vehicle occupants (not shown in the drawings). Regardless of the specific structure of a vehicle, it can be assured in this way that the steering wheel 3 will always be in a position providing proper expansion of an airbag 14, which in this case is mounted in the steering column 1. The folding of the airbag 14 is indicated symbolically in FIG. 1. Preference is given to a pleated folding, in which an uppermost layer is first ejected by the stream of gas from gas generators 15 and 16, and subsequently all the other pleats are drawn out. Alternatively, however, other kinds of folding may be adopted such as so-called gathering, Leporello folding, etc. The air bag 14 in this case is inflatable by at least one of the two gas generators 15 and 16 contained in an intermediate segment 17 of the steering column. Each of the gas generators 15 and 16 is provided with ring fuses 18 and 19 which are activatable in response to signals from a control unit 22 to actuate triggers in the nature of firing pin arrangements 20 and 21, such as hammers preferably of pin configuration, propelled by small charges. The firing pin arrangements 20 and 21 are fixed to a steering column sleeve 23 in which the steering column 1 is rotatably mounted on ball bearings 24 and 25. The steering column 1 is mounted on a schematically illustrated vehicle frame structure 27 by a force-limiting mount 26.

In the illustrated embodiment the force-travel characteristic of the force-limiting mount 26 is controllable by a throttling valve 28 which is operable by the control unit 22. The steering column 1 is thus a constituent of an occupant protection arrangement in which, in addition to the safety factors provided by the steering column 1 itself, other features are provided to reduce the risk of injury to occupants. To control the force-travel characteristic of the force-limiting mount 26, various parameters may be taken into account separately or in combination. A schematically illustrated sensor arrangement 29 includes a sensor system by which, for example, the following parameters may be detected: occupant weight, position of a driver's seat (not illustrated), backrest inclination of a driver's seat, timing of vehicle deceleration due to an accident, deformation of vehicle structure due to an accident as function of the location of the collision and/or the intensity of impact, the number of impacts on the vehicle, and the filling behavior of the airbag 14.

One important aspect of the embodiment shown in FIG. 1 is the folding of the airbag 14 in such manner that some folds are laid precisely in the corrugations of the deformation member 12. The gas emerging from the gas generators 15 and/or 16 through corresponding diffusers 30 and 31 first produces an opening pressure acting on a cover 32. The folds laid in the corrugations then inhibit expansion of the airbag 14 in a defined manner so as not to strike a vehicle occupant with undue force. In addition, this arrangement assures that the fabric of the gas airbag will not be exposed to undue stress by the internal gas pressure.

In the embodiment shown in FIG. 1, the deformation member 12 is also an airbag container. A fastening ring 33 positioned between the gas generators and the corrugated deformation member 12 prevents the airbag 14 from being disconnected from the steering column 1, even under fill gas pressure.

The gas generator 15, as illustrated, has a toroidal configuration, so that the emerging gas from the diffuser 30 can also enter the airbag 14. Alternatively to the illustrated embodiment, however, the diffuser 30 may be turned instead to face the compression member 13 so that it may inflate a foot chamber or knee airbag, for example, contained in the deformation member 13, through outlet openings (not shown).

The activation of the gas generators need not necessarily result from a mechanical action on ring fuses, but may, for example, result from electromagnetic transmission of ignition energy. For example, a coil system attached to the steering column sleeve 23 may cooperate with a coil ignition system associated with one of the propellant charges of the gas generators 15 and 16. The transmission of an electromagnetic ignition signal from the rotationally fixed steering column sleeve 23 to the gas generators as shown makes it possible to dispense with the conventional winding springs heretofore used. Assembly of the steering column arrangement shown in FIG. 1 is thereby facilitated because only components which are fixed together as installed need to be wired together.

The present invention is important in terms of fabrication for other reasons as well. Thus, for example, a preassembly can be provided in which the steering column 1 is in tubular form and provides a container for the airbag 14 and the gas generators 15 and 16. In a preferred embodiment, this tubular steering column 1 is produced by internal high-pressure molding in which all important parts of the steering column 1 according to the invention are molded into the steering column material. This applies not only to the adapter segments associated with the steering column base 6 and the steering wheel 3, but also to the shape of the deformation members 12 and 13 per se. Since interior high-pressure molding permits geometries to be varied over wide ranges, a judicious choice of wall thicknesses and definition of cross-sections can also specify a deformation behavior which is as appropriate as possible to various potential accident situations. Wall thickness and/or geometry variations will also permit selection of different force-travel characteristics for the deformation members 12 and 13, for example, by a choice of different diameters. Preference is given to a softer characteristic of the upper deformation member 12 compared to the lower deformation member 13, so that, after the air bag 14 has unfolded completely, a vehicle occupant's head engaged by it is at first supported with a limited force before deforming stress transmitted from the front end of the vehicle acts on the deformation member 13.

Figure 2:
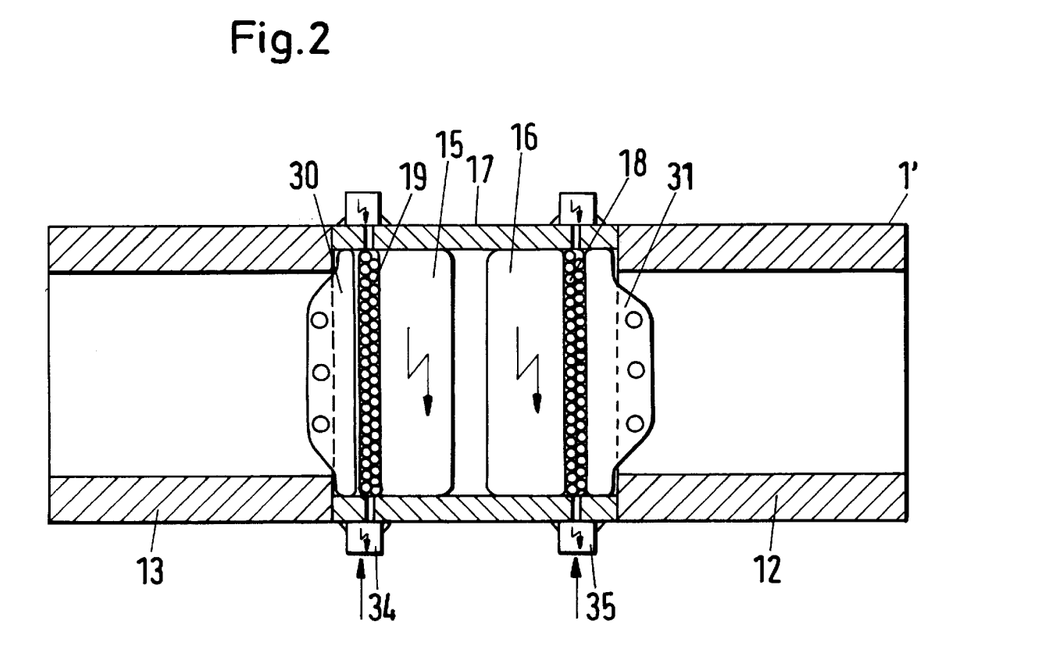
FIG. 2 is a fragmentary view in longitudinal section illustrating a preassembly from which a steering column arrangement according to the invention may be fabricated.

Alternatively, consideration may be given to fabricating the steering column 1 by rolling. Preferably a semifabricated preassembly 1', as shown in FIG. 2, assembled from three tube segments 12, 13 and 17 having different wall thicknesses is used. The different wall thicknesses may be the result of a forming process on a single semifabricated tube bar, or they may derive from the use of three tube segments which have different wall thicknesses and are assembled by friction welding or other joining techniques.

In the embodiment shown in FIG. 2, the intermediate segment 17 of the steering column and the gas generators 15 and 16 with diffusers 30 and 31 are combined beforehand in a subassembly. To this subassembly, either ready pre-deformed deformation members 12 and 13 are then attached, or semifinished members to be subjected to another forming operation after attachment to the intermediate segment 17 are attached. Alternatively, at least one gas generator with a diffuser is integrated in a semifinished tube which is smooth-walled on the inside. Axial fixation of such pre-installed gas generators is then accomplished by rolling in of the free ends of the tube. In other words, a rolling operation necessary to produce the contour of the deformation member may be used at the same time for affixing the gas generators. The several pre-deformed parts of the assembly may be composed of different materials.

In contrast to the exemplary embodiment shown in FIG. 2, at least one of the deformation members 12 and 13 may be combined with a diffuser 30 in an integral unit which is then connected by a thermal joining technique to the intermediate segment 17 of the steering column which already contains the gas generators 15 and 16. Two housing elements 34 and 35 for the ring fuses 18 and 19 may be constructed as parts to be fixed in place later or provided as integral parts of this assembly.

Housings for the gas generators 15 and 16 need not necessarily be provided as inserts for tubes. Instead, it is possible to use the intermediate segment 17 of the steering column directly as a gas generator housing.

Figure 3:
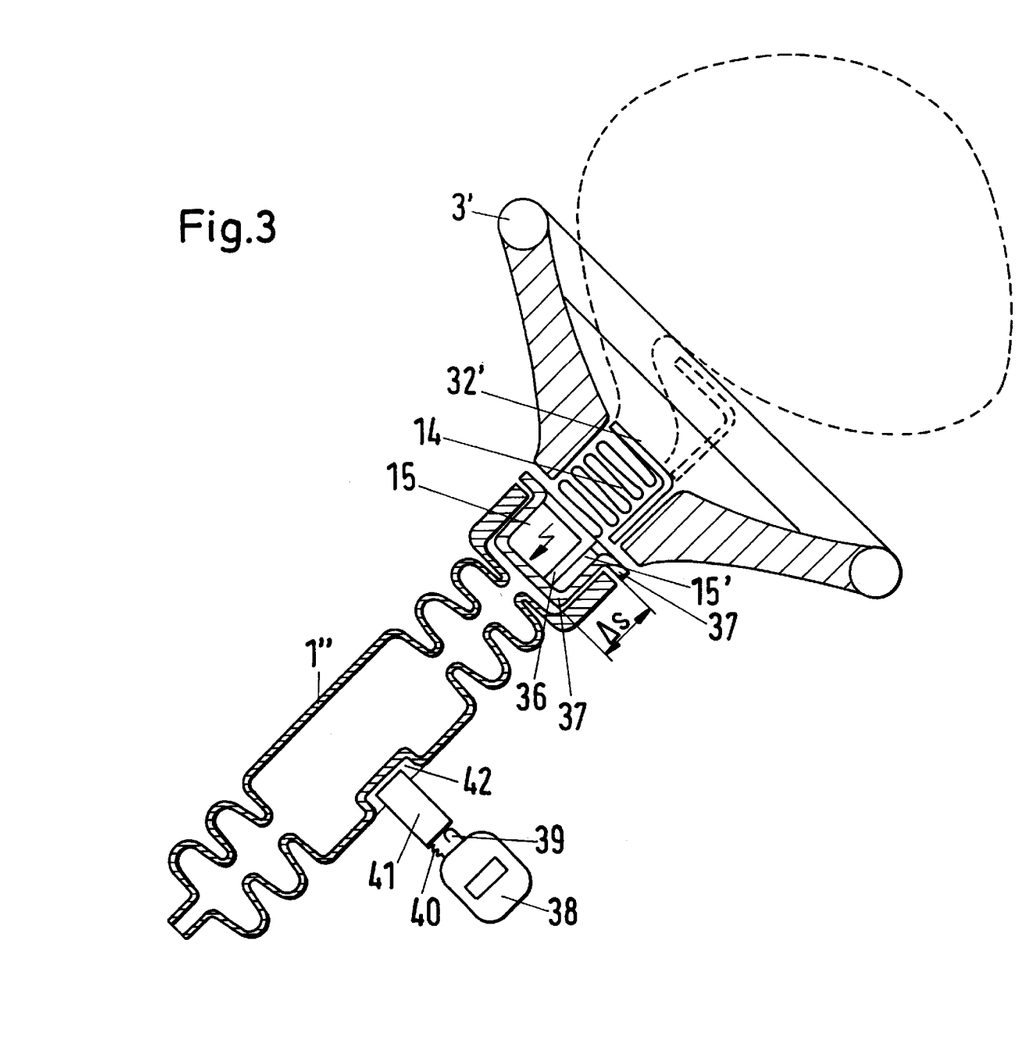
FIG. 3 is a schematic view in longitudinal section showing a second embodiment of the invention.

Of particular importance in the embodiment shown in FIG. 3 is the provision of a cover 32', which is recessed into the hub of a steering wheel 3' and has a stable shape, the steering wheel 3' being, for example, mounted on a steering column 1" a manner similar to the airbag arrangement described in published International Application No. WO 97/01460. The arrangement of the steering wheel 3' as described herein on steering columns of conventional construction is, however, also possible. Contrary to the airbag covering principles heretofore in common use, the cover 32' is in this case not articulated to the surface of the steering wheel hub, but is located inwardly from the surface. A point of articulation 36 is, for example, fixed in a guide 15' inwardly of the hub in a bottom portion of a gas generator housing. The unfolding air bag 14 can then move the cover 32' into an open position in which it does not protrude outside the contour of the steering wheel 3'. Thus, a driver who may happen to be very close to the steering wheel cannot be injured by the opening motion of the cover. This open condition is shown dotted outline in FIG. 3.

In the illustrated example, the point of articulation 36 of the cover can move forward by a determined distance Δs in a gas generator cup 37 which is formed as a connector to the steering column 1". It should be noted here that FIG. 3 is merely a schematic representation of the principle. The articulation of the cover 32' as well as its specific structure may be varied broadly. Thus, for example, the point of articulation 36 need not necessarily be located within the steering column 1". With a suitably shaped steering wheel hub, the cover 32' may instead be within the steering wheel hub itself, independently of the gas generator. The cover 32' itself, or the particular arrangement of its articulation to the steering wheel hub or to the steering column 1" may likewise be of energy-absorbing design, to make possible a controlled unfolding of the airbag 14.

FIG. 3 also shows schematically an ignition lock 38 having a control cam 39 cooperating with a steering column 1" constructed according to the invention to provide a steering wheel lock. For this purpose, a locking member 41 urged by a tension spring 40, for example, into an open position is movable by the control cam 39, into a stop recess 42 formed in the steering column 1" by internal high-pressure transformation. However, a simple hole or perforation in the member 1" or perforation may also be provided as a stop recess. Alternatively to the arrangement shown in FIG. 3, locking elements may be provided in the region of the steering column base 6, which is illustrated in FIG. 1, and such locking elements may be movable into closed and/or open position by electrically operable actuators, for example.

Figure 4:
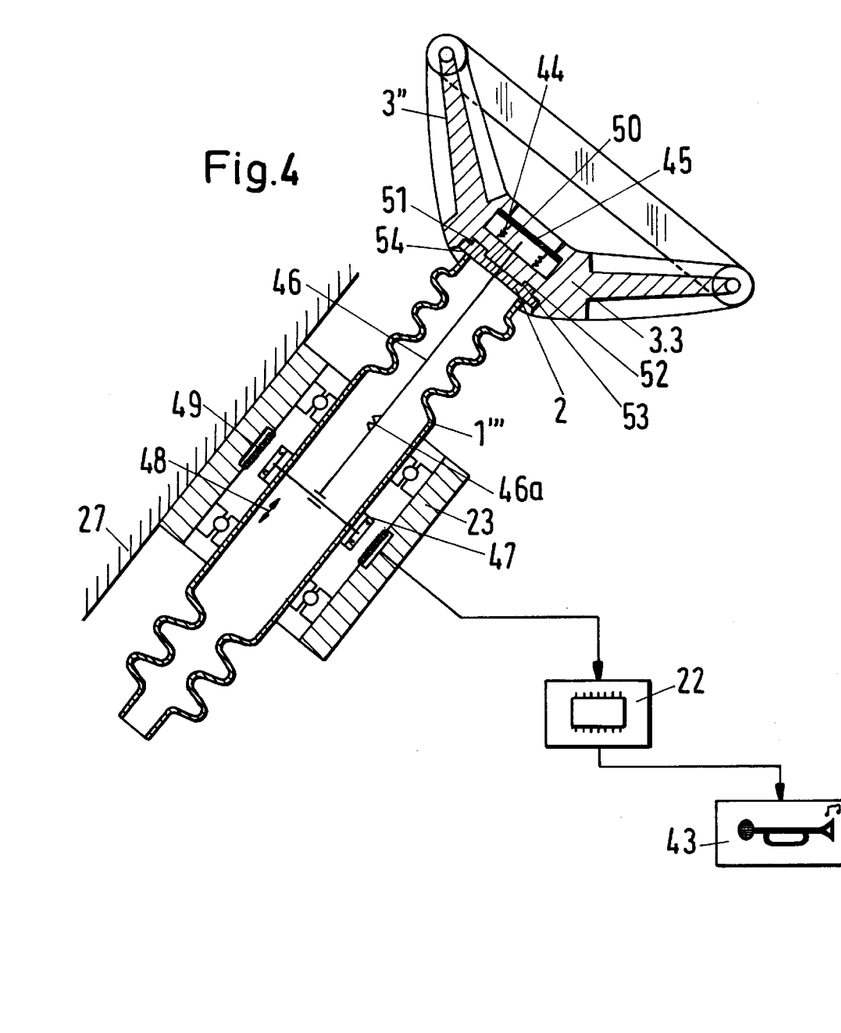
FIG. 4 is a view similar to FIGS. 2 and 3 showing a third embodiment of the invention.

The typical embodiment shown in FIG. 4 includes an occupant protection system providing an actuating arrangement whereby an electrical appliance, for example, a horn 43, may be operated. In this arrangement, a pressure plate 45 supported on compression springs 44 functions as transmitter, the plate being provided with a slender rod 46 enabling the displacement of an annular permanent magnet 47 and the rod 46 having a weak spot 46*a* that can buckle or shear under overload due to an accident. The displacement of the magnet 47 in response to depression of the plate 45, represented by the double arrow 48, is sensed by an annular coil 49 associated with the steering column support sleeve 23. A signal generated in this way is transmitted to the control unit 22 which processes it to acuate the horn 43. Alternative contactless signal transmission arrangements, different from the arrangement illustrated in FIG. 4, may be based on capacitive or optical coupling. To acquire a signal capacitively, for example, a dielectric element movable by the pressure plate 45 could be advanced between opposed condenser plates associated with the steering column sleeve 23. So-called horn foils by also be employed as transmitters.

In the region of a steering wheel hub 3.3 shown in FIG. 4, a steering wheel 3" is formed with a flange surface 50 having recesses 51 and 52 engaged by lugs 53 and 54 which are molded on a connecting part 2 for transmission of steering torque. The connection between the flange surface 50 and the connecting part 2 may be effected by a bonded or bolted joint, constituted by a bayonet fastening which can be clamped by a clamp member not illustrated in the drawing. An important aspect of this arrangement is the construction of the coupling between the hub 3.3 and the steering wheel column 1" as a modular system. A hub member, of integral configuration, with uniform airbag interior dimensions and uniform connection dimensions and geometries, may be customer-and/or vehicle-specifically formed in very different ways. By the same technology, various visual appearance concepts of the steering wheel 3", as a man-vehicle interface, can be produced.

Figure 5:
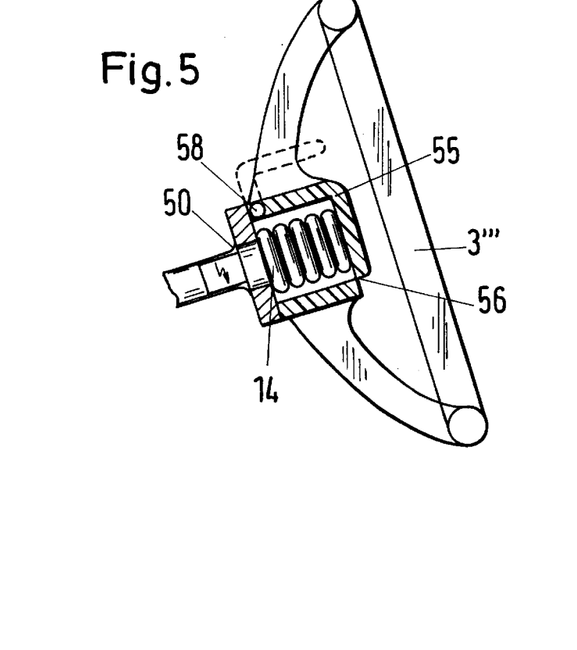
FIG. 5 is a side view showing a steering wheel providing a constituent part of the occupant protection arrangement.
Figure 6:
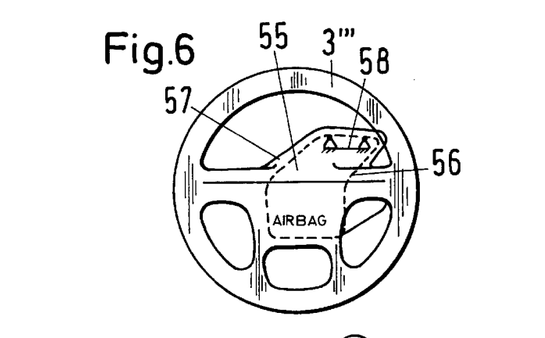
FIG. 6 is a perspective representation of the steering wheel shown in FIG. 5.

As an alternative to the cover 32' shown in FIG. 3, an integral cap, shown in FIGS. 5 and 6 may be provided which is releasable from a hub column 57 by a tear seam 56, similar to the instrument panels arrangements described for example in German Offenlegungsschrift No. 43 06 149 and U.S. Pat. Nos. 5,072,067 and 5,350,191. Of particular importance to the present invention is the articulation of the cap about a bearing arrangement 58 such as a rotary joint, film hinge or the like, at the end adjacent to the flange surface 50. This articulation, located at the inner end of the hub, assures that, during the opening motion, the integral cap 55 will not protrude forwardly from the steering wheel rim toward vehicle occupants. In particular, any occupants sitting close to the steering wheel, for example small woman drivers, therefore will not be exposed to any additional hazard by the opening motion of the airbag cover. The integral cap may also be of multipartite construction so that, for example, two flap parts articulated inwardly of the hub can cooperate to clear an opening. The arrangements illustrated in FIGS. 3, 5, and 6 are of interest especially in connection with the accommodation of airbag components inside the steering column 1 because the location of these components inwardly from the steering wheel reduces the volume required for by the hub. Thus the hubs themselves, and consequently also the coverings for the airbags 14, can be made smaller. This also reduces the risk of injury caused by opening of the cover.

The steering column arrangements, occupant protection arrangements, steering system and steering column structures of the invention are not limited to the particular embodiments shown in the drawings, but may be combined with each other in various ways. It should be noted also that individual elements of the various embodiments of the invention as described herein may contribute significantly to minimizing the risk of injury in combination with conventional steering systems or their components.

Although the invention has been described herein with reference to specific embodiments, many modifications and variations therein will readily occur to those skilled in the art. Accordingly, all such variations and modifications are included within the intended scope of the invention.

We claim:

1. A steering column arrangement comprising:

a steering column having a first connection connected to a steering wheel and a second connection connected to a steering mechanism and an intermediate column segment supported for rotation between the first connection and the second connection, and compression means including at least one first deformation member associated with the first connection and at least one second deformation member associated with the second connection;

wherein the deformation members and the intermediate column segment of the steering column comprises a one-piece tubular member;

whereby the distance between the first and second connections can be reduced when a predetermined force is applied to the steering column in the axial direction due to an accident.

2. A steering column arrangement according to claim 1 wherein at least one of the deformation members has a corrugated tube or bellows shape.

3. A steering column arrangement according to claim 1 wherein the tubular member has walls with different thicknesses for the first and second deformation members and for the intermediate column segment of the steering column.

4. A steering column arrangement according to claim 1 wherein the tubular member further comprises at least one adapter segment coupling the tubular member to at least one of a steering wheel and a linkage element for the steering mechanism.

5. A steering column arrangement according to claim 4 wherein at least one of the first connection and an integral adapter segment comprises a torque-transmitting snap fastening.

6. A steering column according to claim 1 wherein a housing wall of the intermediate column segment of the steering column is supported by a steering column bearing.

7. A steering column according to claim 1 wherein at least one of the first and second connections is integrally molded on a corresponding deformation member.

8. A steering column arrangement according to claim 1 wherein at least one column segment is positioned to be engaged by a locking member of a vehicle steering wheel lock on a vehicle.

9. A steering column arrangement according to claim 1 wherein at least one propellant charge is mounted in the intermediate column segment the steering column to cause inflation of at least one air bag to provide a restraining element for the protection of a vehicle occupant in an accident.

10. A vehicle occupant protection arrangement comprising a steering column arrangement according to claim 1 and at least one airbag which is inflatable by gas from at least one propellant charge in response to a control signal, the steering column supporting the propellant charge, and a steering column sleeve rotatably supporting the steering column and supported from a vehicle structure by at least one force-limiting member having a variable force-travel characteristic which is adjustable within predetermined limits.

11. A vehicle occupant protection arrangement according to claim 10 including a control unit providing a further control signal adjusting the force-travel characteristic of the at least one force-limiting member as a function at least one of an occupant weight, a position of a vehicle seat, a backrest inclination of a vehicle seat, timing of a vehicle deceleration, deformation of a vehicle structure due to an accident, a number of impacts on the vehicle, the location of a collision on the vehicle, and filling behavior of the airbag.

12. A vehicle occupant protection arrangement comprising a steering column arrangement according to claim 1, at least one airbag associated with the steering column, at least one propellant charge, at least one gas generator inside the steering column for inflating the airbag in response to a control signal, at least one accident sensor for generating a control signal for inflating the airbag, a steering column sleeve rotatably supporting the steering column, and at least one trigger means, supported by the steering column sleeve, by which the propellant charge for the at least one gas generator is activatable.

13. A vehicle occupant protection arrangement according to claim 12 wherein the at least one gas generator includes a fuse and wherein the trigger means comprises an impact member activatable by a further propellant charge to act upon the fuse.

14. A vehicle occupant protection arrangement according to claim 13 wherein the fuse is a ring fuse rotatable with the steering column and normally not in contact with the trigger means.

15. A vehicle occupant protection arrangement according to claim 12 wherein, in response to the control signal, the trigger means generates electromagnetic energy by which the at least one propellant charge is activatable.

16. A vehicle occupant protection arrangement according to claim 12 including at least one diffuser in the path of gas generated by the gas generator for controlling the flow behavior of a stream of gas generated by the propellant charge.

17. A vehicle occupant protection arrangement according to claim 16 wherein at least one of the at least one diffuser and the at least one gas generator are combined in a subassembly contained in an intermediate segment of the steering column.

18. A vehicle occupant arrangement according to claim 17 wherein components of the subassembly are combined by at least one of thermal joining and mechanical engaging means.

19. A vehicle occupant protection arrangement according to claim 17 wherein at least one pair of elements of the subassembly is of unipartite configuration.

20. A vehicle occupant protection arrangement according to claim 16 wherein the at least one diffuser is combined in a subassembly with at least one deformation member.

21. A vehicle occupant protection arrangement according to claim 16 wherein the at least one diffuser is combined in a subassembly with the intermediate segment of the steering column.

22. A vehicle occupant protection arrangement comprising a steering column arrangement according to claim 1, a sleeve rotatably supporting the steering column, a steering wheel, an actuating means in the steering wheel having at least one motion transmitter operating an electrical device, signal transmission means capable of contactless transmission of a signal generated by the motion transmitter, and control means responding to a signal transmitted by the signal transmission means for operating the electrical device.

23. A vehicle occupant protection arrangement according to claim 22 wherein the signal transmission means comprises at least one permanent magnet and at least one magnetic field detector means and wherein one of the permanent magnet and the magnetic field detector means is variable in position by the at least one motion transmitter, and wherein the magnetic field detector means detects a relative change of position of the permanent magnet to acquire an operating signal and the operating signal is processed by the control means to operate the electrical device.

24. A safety steering arrangement comprising a steering column arrangement according to claim 1, and a steering wheel affixed to the steering column by a snap fastening having a part secured to the steering column by at least one securing element.

25. A safety steering arrangement according to claim 24 wherein the securing element is a screw or a bolt arrangement comprising a bayonet fastening clamped by a clamp member.

26. A safety steering arrangement comprising a steering column arrangement according to claim 1 including wherein the steering wheel has a flange surface bonded to a segment of a deformation member.

27. A safety steering arrangement according to claim 1 including deformation member segments and wherein the steering wheel has a flange surface connected to a deformation member segment by a bolted connection.

28. A safety steering arrangement according to claim 26 or claim 27 including engagement means on the deformation segment and on the flange surface by which steering torques can be transmitted.

29. A method of producing a vehicle steering column comprising:
  providing a tubular member for a steering column with segments to produce deformation members and with an intermediate column segment between the deformation member segments by assembling the deformation members and the intermediate column segment;
  inserting a subassembly comprising a gas generator and a diffuser having a cartridge-like configuration into the tubular member; and
  deforming of the deformation member segments while simultaneously fixing the subassembly in the tubular member.

30. A method according to claim 29 wherein the tubular member is produced by internal high-pressure forming.

31. A method according to claim 29 wherein the tubular member is produced by rolling.

32. A method according to claim 29 wherein the tubular member is formed from tubular stock.

33. A method according to claim 32 wherein the tubular stock comprises hollow cylinders having different wall thicknesses and joined at open ends.

34. A method according to claim 29 wherein the subassembly also comprises an airbag.

35. A method according to claim 34 including incorporating a steering wheel in the subassembly.

36. A method of producing a vehicle steering column comprising:

providing a one-piece tubular steering column member having deformation member segments and an intermediate column segment between the deformation member segments;

combining the intermediate column segment of the steering column with a subassembly comprising a gas generator and a diffuser into a group; and forming the deformation member segments into deformation members.

37. A steering wheel arrangement comprising a steering wheel having a hub, at least one cover positioned in the region of the hub, an airbag mounted within the hub and inflatable by a propellant charge so as to project into an open position, and articulation means connecting the cover to the hub and providing articulated support for the cover and positioned to prevent the cover from protruding beyond the steering wheel upon actuation of the propellant charge.

38. A steering wheel according to claim 37 wherein the cover is a dish shaped member which is not deformable by expanding gas and which comprises a fastening segment directed inwardly of the hub for supporting the cover.

39. A steering wheel according to claim 38 wherein the fastening segment comprises a deformation element with a predetermined deformation capacity.

40. A steering wheel according to claim 37 wherein the cover is an integral constituent of a hub cowling and is detachable therefrom by the inflating airbag and is articulated at least indirectly to the hub in a region of a connection flange on a steering column side of the hub.

* * * * *